United States Patent
Motamed (10) Patent No.: US 6,327,047 B1
(45) Date of Patent: Dec. 4, 2001

(54) AUTOMATIC SCANNER CALIBRATION

(75) Inventor: Margaret Motamed, Foster City, CA (US)

(73) Assignee: Electronics for Imaging, Inc., Foster City, CA (US)

( * ) Notice: Subject to any disclaimer, the term of this patent is extended or adjusted under 35 U.S.C. 154(b) by 0 days.

(21) Appl. No.: 09/235,642

(22) Filed: Jan. 22, 1999

(51) Int. Cl.$^7$ ...................................................... B41B 15/00
(52) U.S. Cl. ............................ 358/1.15; 399/72; 358/406
(58) Field of Search .............................. 358/1.1, 1.2, 1.3, 358/1.4, 1.12, 1.15, 1.16, 1.18, 504, 506, 513, 518, 527, 526, 406; 399/72

(56) References Cited

U.S. PATENT DOCUMENTS

| | | | | |
|---|---|---|---|---|
| 4,095,248 | * | 6/1978 | Kolker et al. | 358/486 |
| 4,180,741 | * | 12/1979 | Palmatier et al. | 250/559 |
| 4,618,248 | * | 10/1986 | Buchar | 399/72 |
| 5,004,340 | | 4/1991 | Tallis et al. | 356/243 |
| 5,107,332 | * | 4/1992 | Chan | 358/80 |
| 5,194,966 | | 3/1993 | Quardt et al. | 358/406 |
| 5,282,053 | | 1/1994 | Robideau | 358/406 |
| 5,363,318 | * | 11/1994 | McCauley | 364/571.01 |
| 5,420,699 | * | 5/1995 | Yamanouchi et al. | 358/487 |
| 5,452,112 | * | 9/1995 | Wan et al. | 358/504 |
| 5,537,516 | | 7/1996 | Sherman et al. | 395/109 |
| 5,589,951 | * | 12/1996 | Woydich | 358/473 |
| 5,625,469 | * | 4/1997 | Wheeler et al. | 358/488 |
| 5,689,110 | | 11/1997 | Dietz et al. | 250/252.1 |
| 5,760,913 | * | 6/1998 | Falk | 358/298 |
| 6,011,632 | * | 1/2000 | Chiang | 358/406 |
| 6,048,117 | * | 4/2000 | Banton | 400/120.09 |

FOREIGN PATENT DOCUMENTS

| | | | | |
|---|---|---|---|---|
| 0 301 506 A2 | 2/1989 | (EP) | | G03G/15/00 |
| 0 562 971 A1 | 3/1993 | (EP) | | H04N/17/04 |
| 2 308 773 A | 7/1997 | (GB) | | H04N/1/60 |
| WO 92/01264 | 1/1992 | (WO) | | G06F/15/62 |

\* cited by examiner

*Primary Examiner*—Kimberly A. Williams
(74) *Attorney, Agent, or Firm*—Michael A. Glenn (57) ABSTRACT

An automatic scanner calibration method and apparatus is disclosed in which a calibrated target, such as a Kodak® gray strip, is attached to a scanning surface of a scanner. The target is thin and has a width or length of platen of a scanner. During a normal scan, the calibration target area can be ignored or scanned depending on user selection. If the strip is scanned, then the resulting information is used to calibrate the scanner automatically. Such calibration is more accurate than an older in time or preset default calibration Another embodiment of the invention actuates a print of a printer calibration target on a printer on a scheduled basis. Thereafter, the user can take the printer calibration target and place it on the scanner and perform a calibration of a scanner/printer system.

34 Claims, 8 Drawing Sheets

AUTOMATIC SCANNER CALIBRATION

BACKGROUND OF THE INVENTION

1. Field of the Invention

The invention relates to the calibration of a scanner. More particularly, the invention relates to a method and apparatus for automatically calibrating a scanner. Another embodiment of the invention relates to calibrating a printer automatically.

2. Description of the Prior Art

Many scanning and printing technologies are complex and, due to many different physical and environmental factors, may drift in their color response For example, in the case, of a scanner; the quality of light produced by the light source drifts over time due to the gradual variation of both electronic and optical components of the scanner. In the case of a printer, the amount of color toner or ink that is printed on paper changes over time. It is preferable that printers and scanners have a steady and consistent color response.

Prior art systems attempt to compensate for the difference in color behavior between a measured response of the printer or scanner and an ideal response of the printer or scanner by various calibrating techniques. One common way to calibrate a scanner involves scanning a calibrated target strip with a scanner and then using software that accompanies the calibrated target strip to perform the calibration. The software measures density values on the strip and compares the measured values to stored density values known to correspond to the calibrated target strip. The software generates modified or calibrated density values and typically stores the calibrated values in an association table known in the art as the lookup table (LUT). More expensive scanners are capable of running the software, while less expensive scanners run such software on an associated personal computer (PC).

Common in the art are two types of calibrated target strips that come with color management software and that can be purchased on the market. The two common strips are the Kodak® Gray Scale calibrated target strip produced by the Eastman Kodak Corp. of Rochester, N.Y. and the ANSI-standard IT8 target manufactured by, for example, the Agfa Division, Bayer Corporation. The Kodak® Gray Scale comprises patches of varying densities of gray and the IT8 strips comprise color patches.

It is known to calibrate a color image reproduction system by generating a scanner calibration table and a printer calibration table. However, the method is elaborate in that it includes the steps of providing a set of calibration tools that are developed on a separate representative system and the steps of applying the calibration tools to calibrate the color image reproduction system. Refer to S. Wan and A. Leone, Color Image Reproduction System Field Calibration Method and Apparatus, U.S. Pat. No. 5,452,112. (Sep. 19, 1995).

L, Dietz, and T. Baer, Calibration Method and Apparatus For Optical Scanner, U.S. Pat. No. 5,689,110. (Nov. 18, 1997), disclose a method and apparatus for calibrating a specialized optical scanner known as a fluorescence spectrometer. One of the apparent significant applications of a fluorescence scanner is in the field of medicine wherein, for example, a blood sample is mixed with a fluorescence dye, and the blood sample is scanned and analyzed to determine certain cell characteristics. The calibration method and apparatus disclosed in the document by L. Dietz and T. Baer involves such techniques as calibrating to calibration standards, such as gold and rubies, and is not directly relevant to the type of color image scanner addressed in this document.

D. Quardt and K. M. Chang, Optical Scanner Threshold Setting Method and Sheet, U.S. Pat. No. 5,194,966 (Mar. 16, 1993), disclose a method for optimizing optical scanners by automatically determining image processing threshold values using a threshold image calibration sheet. One embodiment comprises the steps of repetitively scanning the sheet until scanner threshold values are determined. Another embodiment comprises the step of a single scan but uses two or more scanner cameras to work together to process the document images. The method disclosed in this document requires a significant amount of labor to complete repetitive scans and/or requires a scanning device having two or more cameras.

D. Sherman, Y. Accad, and E. Steinberg, Method For Calibrating A Color Printer Using A Scanner For Color Measurements, U.S. Pat. No. 5,537,516. (Jul. 16, 1996) disclose a method for calibrating a subject scanner that uses a standard target with respect to a calibrated reference scanner, known as the object scanner. The method generates scanner correction tables for the readings of the subject scanner. The output of the object scanner when scanning a reference target is compared to the output of the subject scanner when scanning the reference target. This method requires a deliberate action on the part of a user whenever calibration is desired in which the user is required to have the target on hand and the user is required to scan the target. Sherman et al. further provides an improved method of measuring ink densities using a subject scanner. In one embodiment, a target is placed at a defocused point with respect to a focal point of the scanning device, and in an alternate embodiment, a diffusing substrate rather than a defocusing means is placed between a target and the scanning device.

It is also known to generate a scanner profile by scanning a standard gray scale test strip comprising a plurality of gray scale patches and comparing the scanned test strip data to a stored data file containing density values known to correspond to the test strip. Refer to R. Falk, Color Calibration Method And System Having Independent Color Scanner Profiles, U.S. Pat. No. 5,760,913, (Jun. 2, 1998). discloses the use of a scanner as a densitometer to calibrate a printer. As in some of the previously described documents, the method and system taught by Falk requires the user to have the standard gray scale test strip or its equivalent readily available and requires the user to scan a calibration target and a test strip on the scanner to perform the desired calibration process.

It would be advantageous to provide an automatic scanner calibration method and apparatus. For example, a user who must perform a calibration of a scanner may have misplaced a calibrated target strip. In the prior art, calibration cannot be performed if a target strip is misplaced.

It would also be advantageous for an automatic scanner calibration method and apparatus to provide a means by which a user can calibrate the scanner during a normal scan of an object. An automatic scanner calibration method and apparatus providing the means to calibrate the scanner during a normal scan of an object has the potential to be more accurate than older in time calibrations and more accurate than a scanner set to the preset default settings provided by the manufacturer. For example, it is well known in the art that a scanner can have a warm up time of about twenty minutes before reaching a steady output value. A user may desire to scan an image prior to a scanner reaching the steady output value. It would be advantageous for the user to calibrate the scanner automatically.

SUMMARY OF THE INVENTION

The invention provides an automatic scanner calibration method and apparatus, including a calibration target strip that a user attaches once to any of an inside surface of a scanner glass, an outside surface of a scanner glass, or to an inside of a scanner cover. During a normal scan of an object, the user can select to ignore the calibration target strip or can select to scan the calibration target strip. If the calibration target strip is scanned, then the scanner is calibrated automatically during the scan of the object.

The presently preferred calibrated target strip is about one-quarter of an inch to one-half of an inch wide and generally has length that is approximately equal to the length or the width of the platen of the scanner. Standard manufactured calibration target strips can be purchased and used in the invention.

The strip also can be customized to suit a combination of needs. For example, the strip can comprise a decal that easily adheres to the scanner glass. The strip can adhere to the scanner in a variety of other ways. For example. the strip can slip into a plastic non-reflective sleeve, where the sleeve is attached to the inside of the scanner cover.

An alternate embodiment of the invention is provided that also comprises automatically calibrating a printer using a scanner. A print of a special printer calibration target is automatically actuated on the printer and a message is generated to ensure that the special printer calibration target is placed on the scanner. The special printer calibration target has interpretable data that represents the printer to be calibrated, the associated printer controller engine, and the date the target is printed. The interpretable data on the special printer calibration target can be embedded in a barcode using barcode technology.

To calibrate the printer the special printer calibration target is scanned on the scanner. During the scan of the special printer calibration target, the user can select also to calibrate the scanner. The calibration target strip attached to the scanner is scanned and the scanner is automatically calibrated before the automatic calibration of the printer without any additional effort by the user.

DETAILED DESCRIPTION OF INVENTION

This invention provides an automatic scanner calibration method and apparatus which includes a calibration target strip that, in the presently preferred embodiment of the invention, a user attaches once to any of an inside surface of a scanner glass, an outside surface of a scanner glass, or an inside of a scanner cover. During a normal scan of an object, the user can select to ignore the calibration target strip or can select to scan the calibration target strip. If the calibration target strip is scanned, then the scanner is calibrated automatically during the scan of the object.

In the preferred embodiment of the invention, the calibrated target strip generally is about one-quarter of an inch to one-half of an inch wide and generally has length that is approximately equal to the length or the width of the platen of the scanner. Standard manufactured calibration target strips can be purchased and used in the invention.

The strip also can be customized to suit a combination of needs. For example, the strip can comprise a decal which easily adheres to the scanner glass. The strip can also be adhered to the scanner in a variety of other ways. For example, the strip can slip into a plastic non-reflective sleeve where the sleeve is attached to the inside of the scanner cover.

An alternate embodiment of the invention is provided that also comprises automatically calibrating a printer using a scanner. A print of a special printer calibration target is automatically actuated on the printer and a message is generated to ensure that the special printer calibration target is placed on the scanner. The special printer calibration target has interpretable data that represents the printer to be calibrated, the associated printer controller engine, and the date the target is printed. In one embodiment of the invention, the interpretable data on the special printer calibration target can be embedded in a barcode using barcode technology. To calibrate the printer the special printer calibration target is scanned on the scanner. During the scan the of special printer calibration target, the user can select also to calibrate the scanner. The calibration target strip attached to the scanner is scanned and the scanner is automatically calibrated before the automatic calibration of the printer without any additional effort by the user.

Figure 1A:
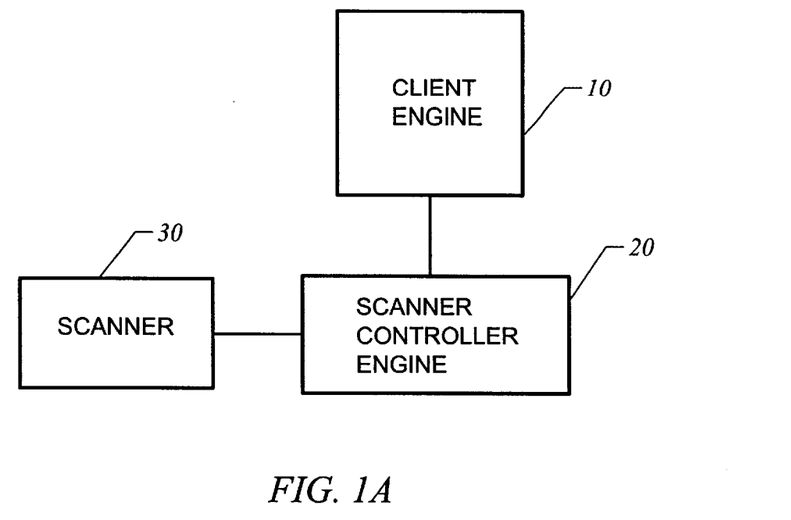
FIG. 1a is a block schematic diagram of the calibration system according to the invention.

FIG. 1A shows a block diagram of an apparatus for practicing a presently preferred embodiment of the invention is shown. A client engine 10 is coupled to a scanner controller engine 20. The scanner controller engine 20 is coupled to the scanner 30. In one embodiment of the invention, the client engine 10 is a personal computer (PC) and the scanner controller engine 20 is software residing on the PC that controls a scanner 30 connected to the PC 10. In this embodiment, a user can scan an image on the scanner 30 by interacting with scanner software 20 on the PC 10.

Figure 1B:
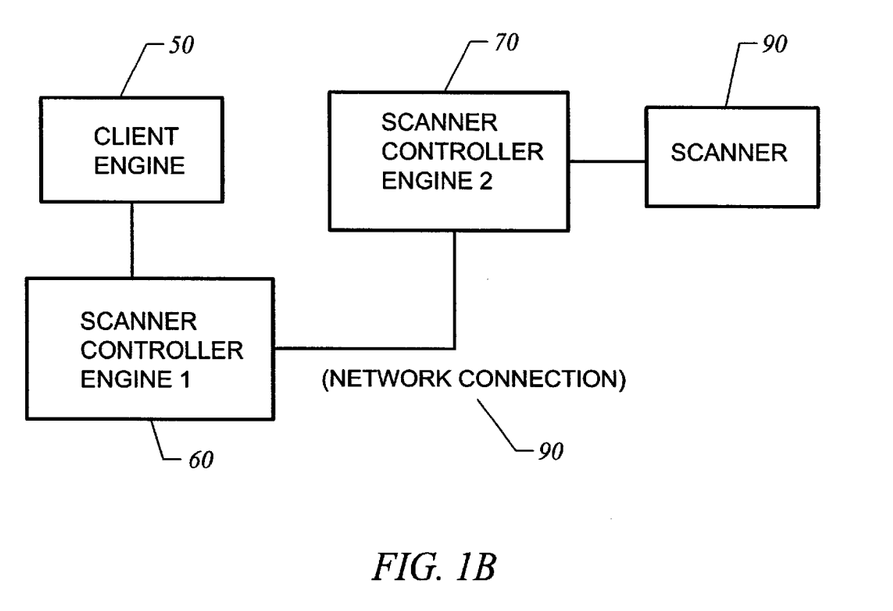
FIG. 1b is a block schematic diagram of the calibration system according to the invention.

Another block diagram of the system for performing calibration in accordance with the invention is shown in FIG. 1b. A first client engine 50 is coupled to a scanner controller engine 60. A first scanner controller engine 60 is coupled to a second scanner controller engine 70 by a network connection 80. The second scanner controller engine 70 is coupled to a scanner 90. In an embodiment of the invention, the client engine 50 is a personal computer (PC), the first scanner controller engine 60 is software residing on the PC, the second scanner controller engine 70 is software residing on what is generally known to anyone in the art as a network, the first scanner controller engine 60 is coupled to the second scanner controller engine 70 by a typical network connection 80, and the second scanner controller engine 70 is coupled to a scanner 90 on the network. In this embodiment, a user can scan an image on the scanner 90 on the network by interacting with scanner software 60 on the PC 50.

The scanner software on the PC 60 comprises a user interface to the scanner controlling software 70 on the network. It will be apparent to a person skilled in the art that this embodiment of the invention particularly addresses what are currently expensive scanners that have embedded scanner controlling software and many varieties of scanners, including for example a copier that is self-contained, containing an interface to the user, as well as a scanner controller engine. The term scanner, as used herein, refers generally to a device for converting, for example, pictures, artwork, documents, transparencies, and photographs, into electronic form.

Figure 2A:
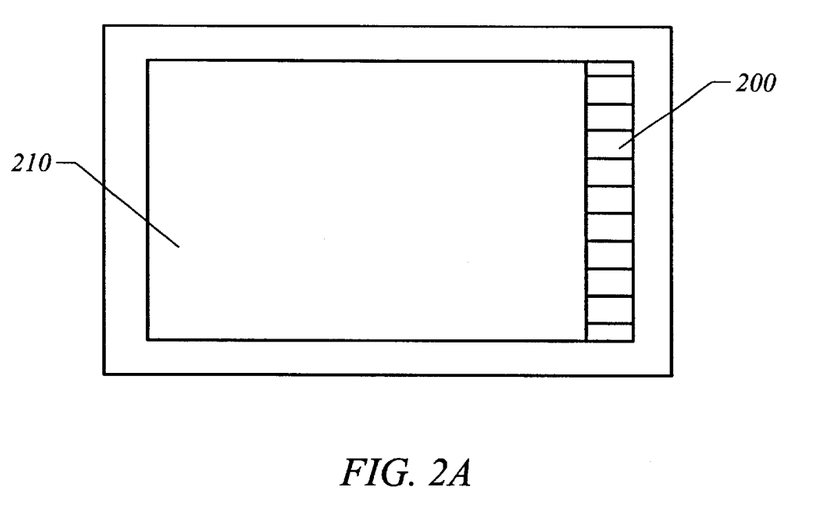
FIG. 2a is a top view of a calibrated target strip disposed on a scanner glass according to the invention.

FIG. 2a is a top view of a calibrated target strip 200 disposed on a surface of a scanner glass 210 according to the invention. In one embodiment of the invention, the target strip 200 is made of decal paper. Other embodiments may include a target strip made of a material that adheres to said glass by static attraction or by "weak" adhesives, such as are used in Post-Its® manufactured by 3M Corporation of Minneapolis, Minn. The adherence mechanism should not possess optical qualities that distort the colors of the target strip. The strip 200 is adhered to the glass 210. The strip 200 can remain on the glass 210 until a user decides to peel it off. The user does not have to worry about losing the strip and the strip is, readily available when the user desires to calibrate the scanner.

Many variations on the properties of a calibrated target strip 200 are possible according to the invention. For example, the calibration target strip can be a photograph on photographic paper. The calibration target strip can be made of a dye sublimation print on photographic paper or on a paper equivalent to photographic paper. The calibration target strip can be made of a plastic material, wherein the plastic material has an adhering surface, and a covering over the surface, such that the adhering surface allows the plastic material to adhere to the top of the scanner glass, the bottom of the scanner glass, or the inside of the cover of the scanner when the covering is removed from the adhering surface. The plastic material can have a dye sublimation print printed on it. A user can apply a protective coating such as, for example, an ultra-violet resistant coating or a scratch resistant coating, to the calibration target strip prior to attaching the strip to the top of the scanner glass, the bottom of the scanner glass, or the inside of the cover of the scanner.

Figure 3:
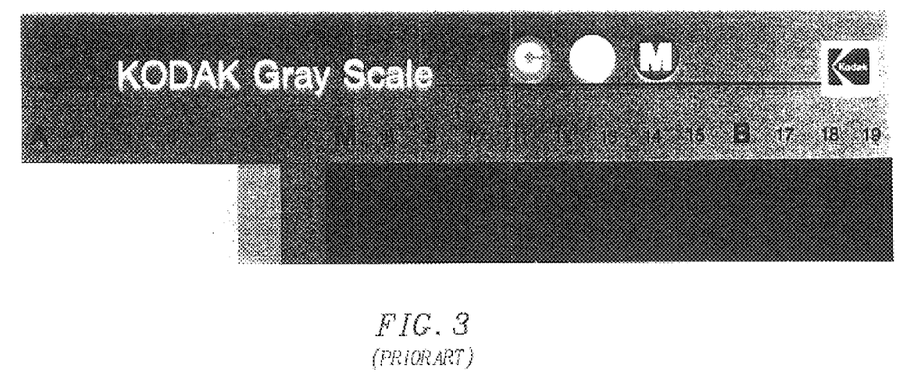
FIG. 3 is a reproduction of a calibration target strip.
Figure 4:
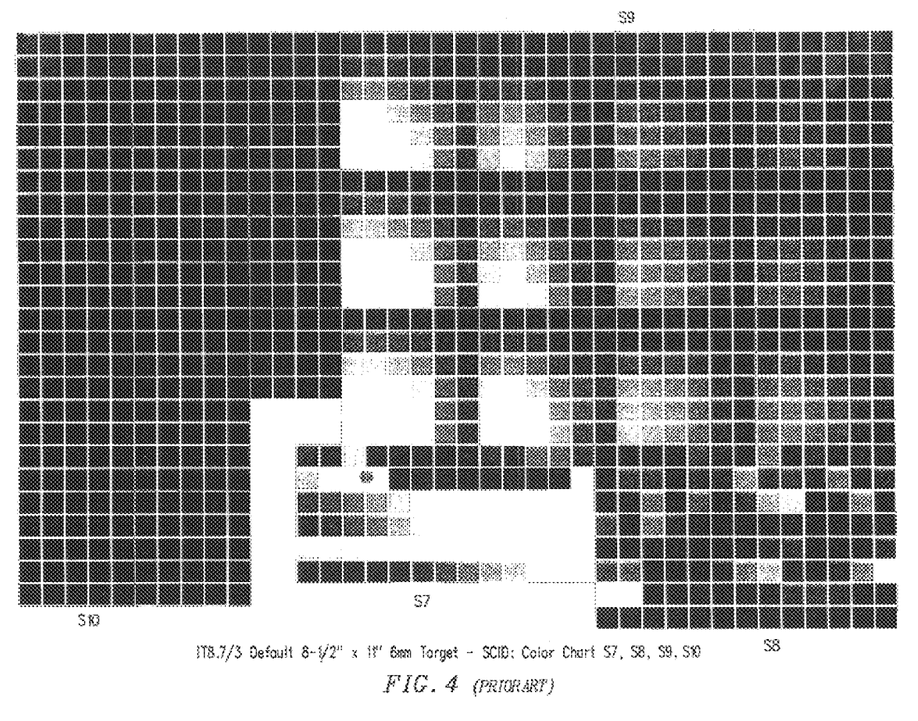
FIG. 4 is another reproduction of a calibration target strip.

Manufactured calibration target strips can be purchased and used in the invention. Two examples of manufactured calibration target strips well known to a person skilled in the art are a Kodak Gray Strip by the Eastman Kodak Corporation of Rochester, N.Y. and the ANSI-standard IT8 target manufactured by, for example, the Agfa Division, Bayer Corporation (see FIGS. 3 and 4). One embodiment of the invention uses a purchased calibration target strip in a scanner that has a tray device located at the scanner glass or located at the inside of the scanner cover, such that the calibrated target strip can be slipped into the tray so that it remains fixed until the user decides to remove the strip. The tray device according to the invention can hold a variety of types of targets in addition to manufactured targets. In another embodiment of the invention, the scanner has a plastic non-reflective sleeve located at the scanner glass or located at the inside of the scanner cover such that a calibrated target strip can be slipped in the plastic non-reflective sleeve.

Figure 2B:
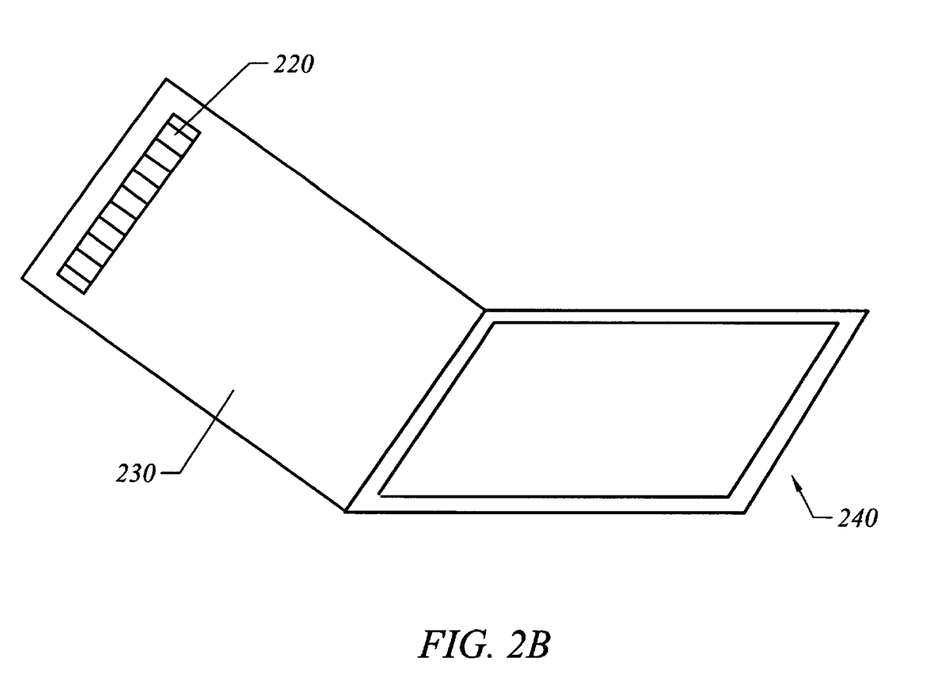
FIG. 2b is a top view of a calibrated target strip disposed on an inside cover of a scanner according to the invention.

Sometimes it is necessary for a user to use the entire scanning range of a scanner when scanning an object. Herein, the scanning range comprises a first surface area that spans a part of or all of the glass of the scanner and a second surface area that extends beyond the first surface area of the scanning range. Refer to FIG. 2b, which is a top view of a calibrated target strip 220 disposed on an inside cover 230 of a scanner 240 according to the invention. In this embodiment of the invention, a calibrated target strip 220 is attached to the inside of the cover 230 of the scanner 240 in such a way that the calibrated target strip 220 is not fully overlapping any part of the first surface area of the scanning range but is overlapping a part of or all of the second surface area of the scanning range. An object covering the entire scanning glass and the calibrated target strip itself can both be scanned. In another embodiment of the invention, the calibrated target strip can be attached to the inside of the cover of the scanner.

In a preferred embodiment of the invention, the calibrated target strip has a width of approximately one-quarter on an inch or one-half of an inch and a length approximately equal to a length or a width of a platen of a scanner. These dimensions of the calibrated target strip ensure that the calibrated target strip occupies the least amount of the scanning range as possible so that as much of the scanning range as possible can be used for scanning objects.

Figure 5:
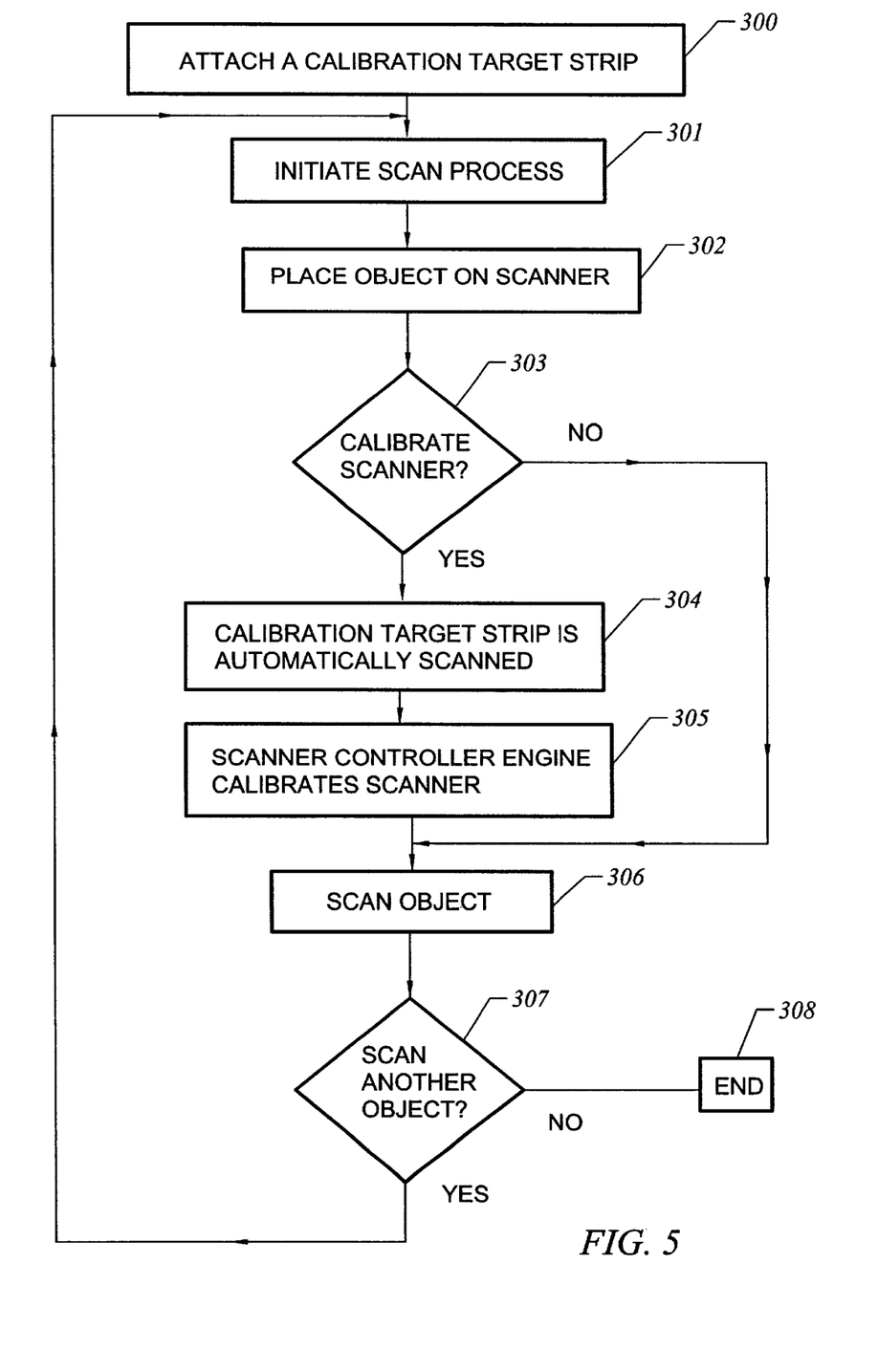
FIG. 5 is a flow diagram showing a method for automatically calibrating a scanner according to the invention.

FIG. 5 shows a flow diagram for automatically calibrating a scanner according to the invention. A calibrated target strip is attached to the inside surface of the scanner glass, the outside surface of the scanner glass, or the inside of the cover of the scanner (300). This step (300) is performed once. A user desires to scan an object on the scanner and initiates the scanning process (301). The user places the object on the scanner (302). By an interactive means with the scanner controller engine, the user decides whether the scanner is to be calibrated or not (303). If the user wants the scanner to be calibrated, the calibrated target strip is automatically scanned (304). Then the scanner controller engine performs the calibration on the scanner using the calibration target strip and generates calibrated values (305). The object is scanned using the updated calibrated values (306). If the user does not want the scanner to be calibrated, then steps (304) and (305) are ignored and the object is scanned using the current calibrated values (306). If the user has no more objects to scan (307), the process ends (308). Otherwise, the process is repeated (301). If the user desires, the user can calibrate the scanner for every single scan. The user can decide not to calibrate during a scan if it is more important to the user to perform the scan quickly rather than take the time to calibrate the scanner.

Figure 6A:
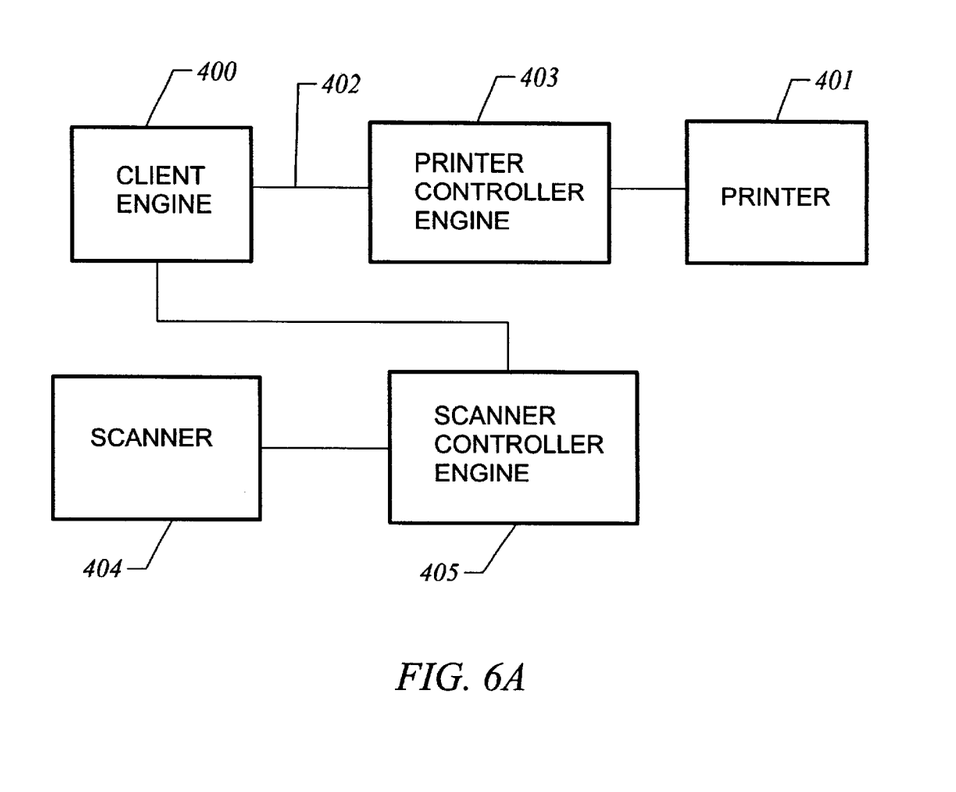
FIG. 6a is a block schematic diagram of an alternative calibration system according to the invention.

FIG. 6a shows a block diagram of an apparatus for automatically calibrating a scanner and for automatically calibrating a printer. A client engine 400 is connected to a printer 401 over a network connection 402 using a printer controller engine 403 that is coupled directly to the printer 401 and to the network connection 402. The client engine 400 is also connected to a scanner 404 using a scanner controller engine 405 that is coupled directly to the client engine 400 and the scanner 404. In one embodiment of the invention, the client engine 400 is a personal computer (PC) and the scanner controller engine 405 is software residing on the PC that controls a scanner 404 that is connected to the PC 400. The PC 400 is connected over the network connection 402 to a printer 401 on the network. The printer controller engine 403 is implemented in software that resides on the network which controls the printer 401.

Figure 6B:
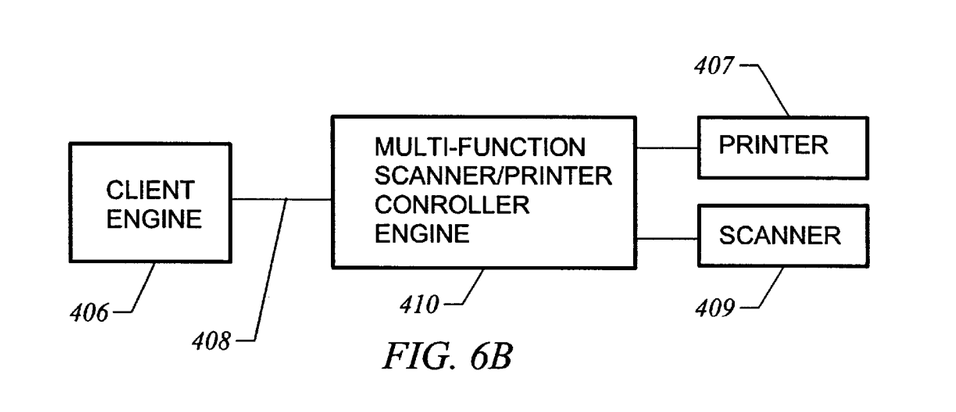
FIG. 6b is a block schematic diagram of an alternative calibration system according to the invention.

FIG. 6b shows a block diagram of an apparatus for automatically calibrating a scanner and for automatically calibrating a printer. A client engine 406 is connected to a printer 407 over a network connection 408 and the client engine 406 is connected to a scanner 409 over a network connection 408. The client engine 406 is coupled to the printer 407 and the scanner 409 using a multi-function scanner/printer controller engine 410 that is coupled to the network connection 408 and that is coupled directly to the printer 407 and to the scanner 409. The client engine 406 is a personal computer (PC) and the multi-function scanner/printer controller engine 410 is implemented in software which resides on the network that controls the printer 407 and the scanner 409.

Figure 7:
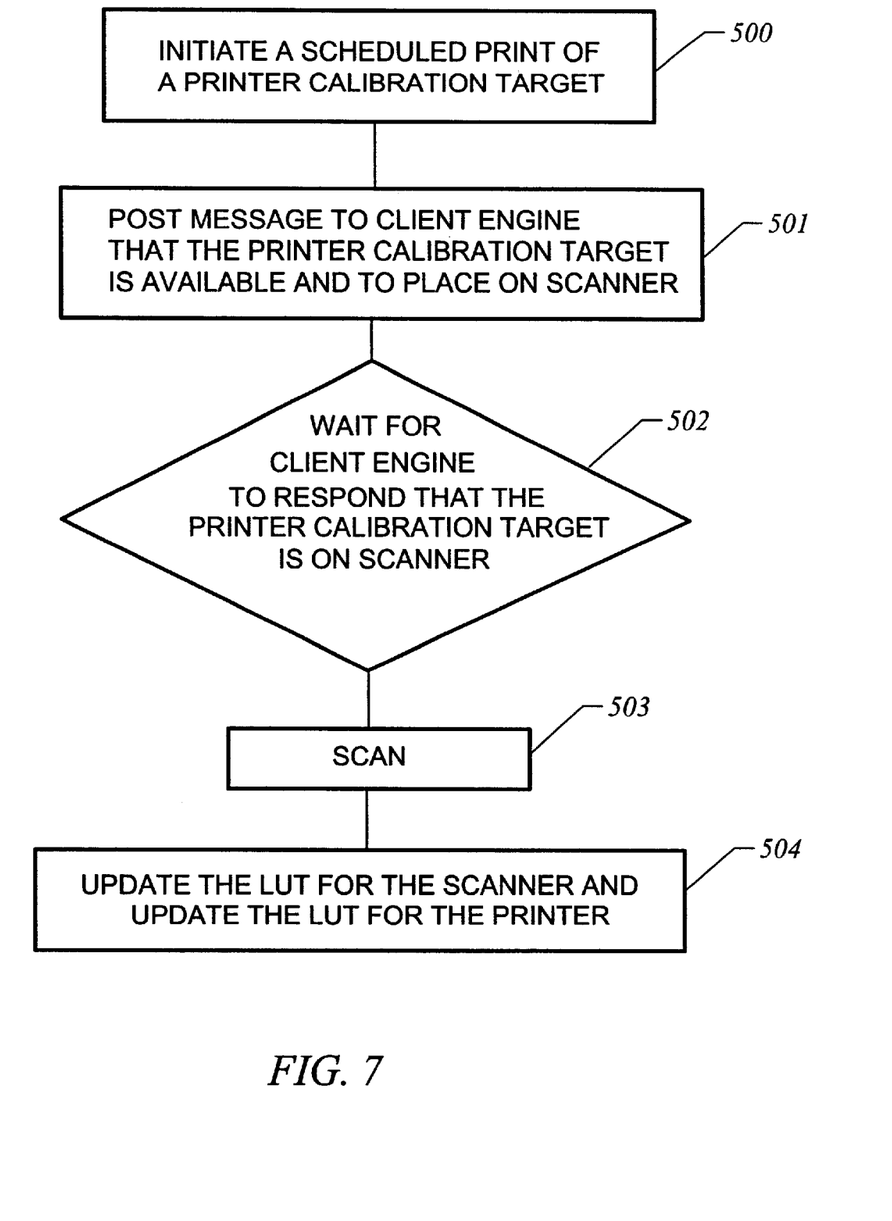
FIG. 7 is a flow diagram showing a method for automatically calibrating a printer and automatically calibrating a scanner according to the invention.

FIG. 7 shows a flow diagram for automatically calibrating a printer and automatically calibrating a scanner. A client engine initiates a scheduled first message to a printer controller engine to print a printer calibration target (500). The schedule can be set according to the convenience of the user such as, for example the schedule can initiate a print each night. Upon completion of the print of the printer calibration target on the printer, the printer controller engine indicates by posting a second message to the client engine that the printer calibration target has been printed and further indicates by the same second message that the printer calibration target should be placed on the scanner (501). The printer controller engine waits for the client engine to respond that the printer calibration target is placed on the scanner (502). The step to scan the printer calibration target is initiated (503). In this embodiment of the invention, a calibration target strip is attached to the scanner and is scanned during the scanning of the printer calibration target. A multi-function scanner/printer controller engine calibrates the scanner and calibrates the printer by updating a lookup table (LUT) for the scanner and updating a LUT for the printer (504). The process illustrated in FIG. 5 provides a mechanism to ensure that the printer is calibrated on a regular basis without depending on a user to remember to calibrate the printer. A similar mechanism may be used to automatically calibrate the scanner in accordance with the embodiment of the invention discussed above.

In another embodiment of the invention, the print of the printer calibration target can be started simultaneously on multiple printers by one software/scanner combination. The operator may then place the printed calibration targets in any order either on the scanner glass or into the scanner's automatic document feeder.

Figure 8:
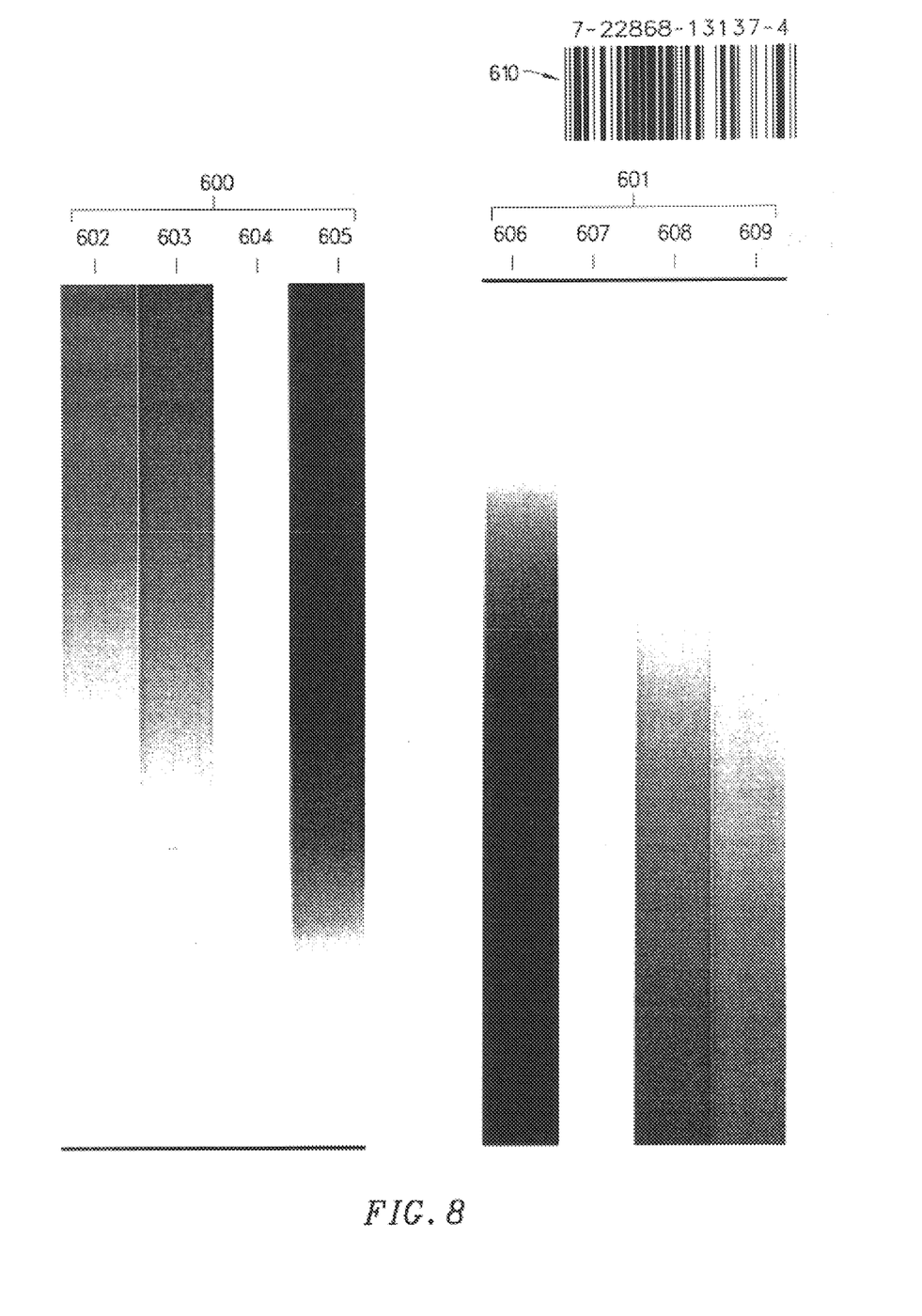
FIG. 8 is a pictorial illustration of a printer calibration target having a barcode according to the invention.

FIG. 8 shows a pictorial illustration of an example of a printer calibration target having a barcode. The target has two columns 600 and 601 of the single ink colorants, cyan, magenta, yellow, and black. The left-hand column 600 has the single ink colorants in the order, cyan 602, magenta 603, yellow 604, and black 605 from left to right. The columns of single ink gradually decrease in density from full ink to no ink. The left-hand column 600 has density values decrease from the top part of the target to the bottom part of the target. The right hand column 601 is organized similarly with some items in the reverse order. The right hand column 601 has the single ink colorants in the order, black 606, yellow 607, magenta 608, and cyan 609 from left to right. The columns of single ink gradually increase in density from no ink to full ink. The right hand column 601 has density values increase from the top part of the target to the bottom part of the target. In the preferred embodiment of the invention, a barcode 610 is printed on the target, the barcode contains data that identify the printer on which the target was printed, the printer controller engine associated with the printer on which the target was printed, and the date the target was printed. Those skilled in the art will appreciate that other information may be printed on the target and that the indicator by which the information is recognized is not limited to bar codes (although a bar code-like mechanism stores information in format that is readily recognized when scanned by the scanner).

Although the invention is described herein with reference to the preferred embodiment, one skilled in the art will readily appreciate that other applications may be substituted for those set forth herein without departing from the spirit and scope of the present invention. Accordingly, the invention should only be limited by the Claims included below.

What is claimed is:

1. A method for automatically calibrating a scanner, comprising the steps of:
   affixing a calibration target to a scanning surface of said scanner; and
   when automatic scanning of said calibration target is selected, selectably using said calibration target for automatically calibrating said scanner during a normal scan of an object.

2. A method as in claim 1, wherein said scanner comprises a platen; and
   wherein said calibration target comprises a width of approximately or equal to a length of or a width of said platen.

3. A method as in claim 1, wherein said calibration target is a Kodak® Gray Strip, an IT8™ target, or an equivalent manufactured calibration target.

4. A method as in claim 1, wherein the calibration target comprises a photograph on photographic paper.

5. A method as in claim 1, wherein the calibration target strip comprises a dye sublimation print on photographic paper or paper equivalent to photographic.

6. A method as in claim 1, wherein the calibration target comprises:
   a plastic material, said plastic material having an adhering surface and a covering over said adhering surface such that the adhering surface allows the plastic material to adhere to a part of the scanner when the covering is removed from the adhering surface.

7. A method as in claim 1, wherein the calibration target comprises:
   a dye sublimation print onto a plastic material, said plastic material having an adhering surface and a covering over said adhering surface such that said adhering surface allows said dye sublimated plastic material to adhere to a part of said scanner when said covering is removed from said adhering surface.

8. A method as in claim 1, further comprising the step of:
   providing a calibration target having a protective coating.

9. A method as in claim 1, wherein the calibration target comprises decal paper.

10. A method as in claim 1, wherein the scanner has a scanning range that comprises a first surface area that spans a part of or all of the glass of the scanner and a second surface area that extends beyond the first surface area of the scanning range; and
   the step of affixing said calibration target comprises;
   attaching said calibration target to a cover of said scanner in such a way that said calibration target is not fully covering any part of the first surface area of the scanning range but is covering a part of the second surface area of said scanning range, wherein said calibration target is within said scanning range of said scanner.

11. A method as in claim 1, wherein the scanner further comprises a tray device located proximate to a scanning surface for holding said calibrated target fixedly therein.

12. A method as in claim 1, wherein the scanner further comprises a plastic non-reflective sleeve located proximate to a scanning surface for fixedly holding said calibration target in said sleeve.

13. An apparatus for automatically calibrating a scanner, comprising:
   a calibration target;
   means for attaching said calibration target proximate to a scanning surface of said scanner; and
   means for automatically calibrating said scanner with said calibration target during a normal scan of said object when said calibration target is selectably scanned.

14. An apparatus as in claim 13, wherein the scanner further comprises;
   a platen; and
   wherein said calibration target comprises a width approximately equal to a length of or a width of said platen.

15. An apparatus as in claim 13, wherein the calibration target is a Kodak® Gray Strip, an IT8™ target, or an equivalent manufactured calibration target.

16. An apparatus as in claim 13, wherein calibration target comprises a photograph on photographic paper.

17. An apparatus as in claim 13, wherein the calibration target comprises a dye sublimation print on photographic paper or paper equivalent to photographic paper.

18. An apparatus as in claim 13, wherein the calibration target strip comprises a plastic material, said plastic material having an adhering surface and a covering over said adhering surface such that said adhering surface allows said plastic material adhere to said scanner when said covering is removed from said adhering surface.

19. An apparatus as in claim 13, wherein the calibration target comprises a dye sublimation print onto a plastic material, said plastic material having an adhering surface and a covering over said adhering surface such that said adhering surface allows said dye sublimated plastic material to adhere to a part of said scanner when said covering is removed from said adhering surface.

20. A calibration target strip in claim 13, wherein said calibration target has a protective coating.

21. A calibration target strip in claim 13, wherein said calibration target comprises decal paper.

22. An apparatus as in claim 13, wherein the scanner has a scanning range that comprises a first surface area that spans a part of or all of said scanning surface of the scanner and a second surface area that extends beyond the first surface area of said scanning range; and
   wherein said calibration target is attached to the cover of said scanner in such a way that said calibrated target is not fully covering any part of the first surface area of the scanning range but is covering a part of the second surface area of the scanning range, wherein the calibrated target is within said scanning range of said scanner.

23. An apparatus as in claim 13, wherein said scanner has a tray fixedly located proximate to said scanning surface for holding calibrated target in said tray.

24. An apparatus as in claim 13, wherein. said scanner has a plastic non-reflective sleeve located proximate to said scanning surface for holding said calibrated target thereto.

25. A method for automatically printing a printer calibration target on a printer and automatically calibrating said printer using a scanner, comprising the steps of:
   providing a calibration target strip attached to said scanner;
   actuating automatically a print of the printer calibration target;
   placing said printer calibration target on said scanner;
   scanning said printer calibration target on said scanner; and
   performing a calibration of said printer using said scanned printer calibration target; and
   automatically scanning the calibration target slip and automatically calibrating said scanner.

26. The method of claim 25, wherein a client engine and a printer controller engine are employed and wherein the method further comprises the steps of:
   generating a scheduled first message from the client engine to the printer controller engine, said scheduled first message automatically actuating the print of the printer calibration target on said printer;
   generating a second message from the printer controller engine to the client engine after the print of the printer calibration target, said second message indicating that the printer calibration target has been printed and indicating that the printer calibration target needs to be placed on said scanner; and
   waiting for the client engine to respond to the printer controller engine that the printer calibration target has been printed on said printer and has been placed on said scanner.

27. The method of claim 26, wherein the printer calibration target has interpretable data, said data identifying said printer and said printer controller engine, and the date that the printer calibration target was printed, and wherein the step of performing a calibration of said printer using said scanned printer calibration target further comprises the client engine interpreting said data to identify said printer to be calibrated and to identify said printer controller engine.

28. The method of claim 27, wherein said interpretable data is included in a printed barcode and wherein the step of scanning said printer calibration target on said scanner comprises scanning said barcode.

29. The method of claim 25, wherein the step of automatically calibrating said scanner further comprises a scanner controller engine or a multi-function scanner/printer controller engine and further comprises the steps of:
   selecting to ignore said calibration target strip or selecting to scan said calibration target strip; and
   calibrating automatically said scanner during scanning of said printer calibration target when said target calibration strip is selectably scanned.

30. An apparatus for automatically printing a printer calibration target on a printer and automatically calibrating said printer using a scanner comprising:
   a printer calibration target;
   a printer;
   means for automatically actuating said printer calibration target to print on said printer;
   a scanner;
   means for placing said printer calibration target on said scanner;
   a lookup table (LUT) for the printer, such LUT mapping a plurality of absolute density values to a corresponding plurality of calibrated density values;
   means for updating said LUT for the printer after the printer calibration target is scanned and by using the printer calibration target, thereby calibrating said printer;
   a client engine and a printer controller engine, and wherein means for automatically actuating said printer calibration target to print on said printer further comprises means for generating a scheduled first message from the client engine to the printer controller engine;

means for generating a second message from the printer controller engine to the client engine after the print of the printer calibration target, said second message indicating that the printer calibration target has been printed and indicating that the printer calibration target needs to be placed on said scanner; and means for waiting for the client engine to respond o the printer controller engine that the printer calibration target has been placed on said printer and has been placed on said scanner.

31. The apparatus of claim 30, wherein the printer calibration target has interpretable data, said data representing information that identifies the printer, the printer controller engine, and the date that the printer calibration target was printed on the printer, and further comprising means for the client engine to interpret said data.

32. The apparatus of claim 31 further comprising:

a calibrated target strip fixedly attached to said scanner;

means for automatically scanning said calibrated target strip;

a lookup table (LUT) for said scanner, said LUT mapping a plurality of input scanner signals to a plurality of corresponding calibrated density values; and means for updating the LUT for the scanner by using the scanned calibrated target strip, thereby calibrating said scanner.

33. The apparatus of claim 32, wherein means for automatically calibrating said scanner further comprises:

means for selecting to ignore said calibration target strip or selecting to scan said calibration target strip; and means for automatically calibrating the scanner during scanning of the printer calibration target when the calibration target strip is selectably scanned.

34. The apparatus of claim 31, wherein said interpretable data is included in a printed barcode and further comprising means for scanning said barcode.

\* \* \* \* \*